US006476152B1

(12) United States Patent
Valkanas

(10) Patent No.: US 6,476,152 B1
(45) Date of Patent: Nov. 5, 2002

(54) METHOD OF PREPARATION OF PRODUCTS WHICH ABSORB WATER INTERMOLECULARLY

(75) Inventor: George N. Valkanas, Maroussi (GR)

(73) Assignee: Innoval Management, Ltd., Curcacao (NL)

(*) Notice: Subject to any disclaimer, the term of this patent is extended or adjusted under 35 U.S.C. 154(b) by 0 days.

(21) Appl. No.: 09/529,938

(22) PCT Filed: Oct. 23, 1998

(86) PCT No.: PCT/GR98/00027

§ 371 (c)(1),
(2), (4) Date: Jul. 21, 2000

(87) PCT Pub. No.: WO99/21897

PCT Pub. Date: May 6, 1999

(30) Foreign Application Priority Data

Oct. 23, 1997 (GR) .......................................... 970100403

(51) Int. Cl.[7] .................................................. C08F 8/36
(52) U.S. Cl. ................................ 525/329.2; 525/332.9; 525/333.5; 525/344; 525/354
(58) Field of Search ............................. 525/329.2, 332.9, 525/333.5, 344, 354

(56) References Cited

U.S. PATENT DOCUMENTS

| 3,972,840 A | 8/1976 | Suzuki et al. |
| 4,177,331 A | 12/1979 | Amick |
| 4,412,028 A | 10/1983 | Lundberg et al. |

FOREIGN PATENT DOCUMENTS

| EP | 0002346 | 6/1979 |
| EP | 0497056 | 8/1992 |
| FR | 2354348 | 1/1978 |
| GB | 1132116 | 10/1968 |

Primary Examiner—Bernard Lipman
(74) Attorney, Agent, or Firm—Birch, Stewart, Kolasch & Birch, LLP

(57) ABSTRACT

A method of crosslinking polystyrene polymers and co-polymers for the formation of macroreticular materials of an Mc 30,000 to 50,000 is described. The materials forming an insoluble gel which is shaped in an extruder to 3 to 5 cm pieces and is subject to sulphonation with dense sulphuric acid, with oleum sulphuric acid with sulphur trioxide and with chlorosulphonic acid, and the introduction of sulphonic groups to a high density and with the introduction of nitric group and with the introduction of carboxylic group with the copolymer styrene-acrylonitrile. The chlorosulfonic group promotes sulphonation and crosslinking with the formation of bridges with the sulfone group which is controlled with a 10–20% of acetic acid present as regulator and an insoluble volume of gel is formed which following drainage of the solvent and after remaining to ripen for 4–7 hours it is treated with ethanol or propanol to extract the unreacted chlorosulphonic acid then is neutralised with sodium or potassium hydroxide subjected to an extruder for the preparation of 3–5 cm products. Following neutralisation and shrinkage to a 10% water content and the products produced are deodorised at a temperature of 160° C. under vacuum and are converted to materials which absorb water inside their molecules up to 300 times their weight; having an inorganic content of 72–75% they exhibit a high degree of stability in the ground, they do not degrade and can be used indefinitely for water absorption-release so that they operate as fertility promoters to any type of soil leading to an increase of green growth, and to the planting of trees and forests and to advance food production.

18 Claims, No Drawings

METHOD OF PREPARATION OF PRODUCTS WHICH ABSORB WATER INTERMOLECULARLY

This application is the national phase under 35 U.S.C. §371 of PCT International Application No. PCT/GR98/00027 which has an International filing date of Oct. 23, 1998, which designated the United States of America.

SUBJECT OF THE INVENTION

The invention is drawn to a method for the preparation of products which comprise a polymer having a macroreticular structure which includes ionic groups in a large density and from which products are derived which absorb intermolecularly, i.e. inside their molecules, large quantities of water, up to 300 times their weight, and which exhibit a high ability, while in the ground, to promote soil fertility, provide for water consumption needs, while reducing overall water consumption of up to 12 times.

OBJECTIVE OF THE INVENTION

The reduction of water consumption is at present a principal subject of global importance. The formation of deserts in several areas of the planet drives this concern and is associated with the survival of the planet. The increased agricultural production to meet the needs of the food demand of the over-populated planet leads to encroachment of nature and to soil erosion. Thus, the primary goal is to meet the needs of water, in a manner that serves but does not erode nature.

This problem is severely aggravated at present, as the water balance alters, the sea starts covering large areas of fertile land leading to a new topography as the equilibrium between the sea and the land reestablishes. It is hence a primary need to introduce new principles for economizing water usage leading to savings associated both with human consumption as well as with the use of water for agricultural purposes.

DEVELOPMENT OF THE INVENTION

The invention, in part, is drawn to products which reduce the amount of water needed for botanical soil thereby leading to water savings in the Earth, in Nature and in Agriculture, thus the invention provides for water economy.

The products which absorb water inside their molecules which are the subject of this invention, are produced following a special crosslinking process for polymers leading to a stable macroreticular structure; such polymers contain active aromatic rings and include polystyrene, hydrogenated SBR, styrene-acrylonitrile and all their co-polymers. As crosslinking agents the dibenzo-X-dimethylbenzene and the sulfonic —$SO_2$, radical are used. The processing is promoted in solutions of the polymer such as in chlorinated hydrocarbon solvents, and in molten phases of the polymers at high temperatures.

The macroreticular polymers as produced in the form of a gel, are practically insoluble and must be subject to processing for the introduction of the ionic groups and for this reason, the macroreticular polymers are subject to a suitable shaping in special cutting equipment where the gel formed is entered in an array of tubes which are one meter long and two to four centimeters in diameter where the gel is cut longitudinally and at its end transversely in three to four centimeter pieces so that discrete particles of dimensions of three by four centimeters are produced. In this form, the pieces are suspended in a solvent and are subsequently subject to sulfonation for the introduction of high density sulfonic groups.

Strong sulfonating agents are utilized in a suspension to introduce sulfonic groups to the aromatic rings of the polymer in a quantity of 1.5–2 moles per mole of the aromatic rings. The sulfonating agents include chlorosulfonic acid, sulfur trioxide and oleum sulfuric acid; the quantity thereof is based on the sulfur trioxide contained therein. Sulfonation is fast and efficient as is the introduction of nitric groups and carboxylic groups, the carboxylic groups can be formed with the use of the co-polymer styrene-acrylonitrile by the hydrolysis of the —CN group. The final shaping to spherical form occurs while the polymer is suspended in the solvent during the sulfonation process. The solvent is decanted and the product is washed with ethyl or propyl alcohol to collect the unreacted chlorosulfonic acid. The product is then neutralized in 30% sodium or potassium hydroxide in a recalculated quantity. Since the product has adsorbed water to a degree of 30–50 times its weight, it is then introduced to a tank which contains a 15–25% sodium chloride solution where the polymer shrinks and the water content reduces to about 10%. The product can also be dehydrated by passing through a 20V electrical field. Finally, the product is heated under vacuum up to 160° C. until it is fully dehydrated and freed from the solvent. The marketable product is able to absorb water up to 150–300 times its weight. It has the form of small spheres or leaves depending on the cutting process in the extruder.

In a different preparation process, a 30% solution of chlorosulfonic acid is added to a 10–30% solution of the polymer in a quantity of 2–2.2 moles per mole of benzene rings on the polymer. The solution contains 12% acetic acid as an inhibitor to control the introduction of crosslinking with sulfone groups. As the sulfonation reaction progresses, as measured by the release of hydrogen chloride, an insoluble gel is formed by the macroreticular evolution of the polymer with the formation of sulfone bridges. As the gel is formed (about 4–6 hrs.), the solvent is removed which constitutes its own layer by draining; the gel is then washed with ethanol or propanol to react with the unreacted chlorosulfonic acid and the solution is drained. Finally, the pure gel, which is a non stirrable semisolid, is neutralized with calculated amounts of sodium or potassium hydroxide. Then it is strained and passed through an extruder where it is cut to the desired size and shape of the particles and is then subject to complete neutralization to reduce the size and to deodorize thereby forming a marketable product as previously described.

As already mentioned, hydrogen chloride is formed during the sulfonation reaction with chorosulfonic acid. This chlorosulfonic acid is formed in situ by combining sulfur trioxide with chlorinated solvents. The formation of chlorosulfonic acid is part of the inventive process.

Furthermore, a process has been developed involving phase dispersion conditions during crosslinking of the polymer with the 1,4-dichloromethyl-2,5-dimethylbenzene wherein the solvent 1,2 dichloroethane separates from an equal volume of dense sulfuric acid at a constant temperature of around 50° C. during which small spheres are formed. Sulfuric acid is then added to the spheres and the temperature is increased up to 80° C., or 1.5–2.0 Mol of chlorosulfonic acid is added at ambient temperatures along with a 12% acetic acid solution to the solvent and, following three hours of stirring, the sulfonation is complete and the product is collected, strained, neutralized, shrunk and deodorized. Finally a product is formed having a high quality of color and spherical shape. In the processing of sulfuric acid and chlorosulfonic acid, straining gives a mixture of solvent and sulfuric acid of a volume of about four cubic meters per ton of product, which must be distilled to collect the solvent and the sulfuric acid for either disposal or reuse.

The present invention, in part, is drawn to products that absorb water intermolecularly following simple immersion of inflated polystyrene into oleum sulfuric acid having a concentration of sulfur trioxide in 20, 30 and 65% with which the polymer is decayed by the sulfur trioxide and large spheres of great uniformity are formed. They exhibit a degree of inflation of 40 to 70 which depends on the degree of inflation of polystyrene. These materials, following 12 hours of maturing, are collected and washed with water. This product is not neutralized but delivered in acidic form and constitutes a product which promotes water economy and fertility in the soil.

In all the above, the process of our invention is described in the form of materials which absorb water intermolecularly and promote fertility to the ground. These products have been studied in terms of activity and the following have been observed:

a) With the addition of these products to the soil, it is possible to have the growth of trees and forests accelerated with 100% survival rates while economizing water on the order of 12 for 120 days;

b) The growth of fruit bearing trees is promoted with an acceleration of growth on the order of 30 to 40%, a biomass production increase of 30 to 50% and a doubling of fruit production;

c) Soil fertility is promoted in problematic, sterile and mountain areas as these materials offer water economy to the ground, and help the growth of greenery and the development of soil biological activity.

These materials which contain water intermolecularly, do not evaporate or leak in the ground, and can be kept in a tank to provide the water needs of plants and of trees, consist of inorganic material to the extent of 72 to 75% where the polymer is only the shell and accounts for only 25–28% of the weight. Thus, these materials have maximum stability in soil where they do not degrade biologically nor are they altered in terms of composition. Thus, the products of the invention can operate for indefinitely long periods of time by absorbing/delivering water in the soil.

As a consequence, the products of the invention, analyzed and described above, constitute means of the highest value and utility in maintaining the natural operation, the promotion of natural growth and the production of food in a sustained manner as they promote soil fertility independently of the quality of the soil and in all types of soil under any conditions.

EXAMPLE No. 1 a. Preparation of the Crosslinking Agent

The mixture of reactants for the preparation of the crosslinking agent 2,5-dichloromethyl-1,4-dimethylbenzene, are: 2462 ml of o-xylene, 2370 ml of a 37% formaldehyde solution in 5 liters of hydrochloric acid solution (35%) (Molar ratio 1:6:12). The mixture is brought to a 10 liter glass reactor heated to 95° C. and stirred for 5 hours; it then remains at normal temperatures for 12 hours forming crystals of the crosslinking agent which are collected by filtration (205 grams). Furthermore, 400 ml of hydrogen chloride are added to the solution. Following heating under stirring for 5 hours and then cooling a new quantity of the crosslinking agent settles (152 grams) with 91% yield.

The product is then recrystallized in alcohol and a pure product is formed with a melting point of 125° C.

b. Preparation of the Macroreticular Gel

In a pilot unit featuring a 200 liter dissolution tank a 2 k.m. sulfonation reactor and other parts which will be described in the following, 30 kg of polystyrene solution in 100 liters of chlorinated solvent is formed: 300 gram of crosslinking agent are added to the solution under stirring conditions, followed by a dense sulfuric acid catalyst until a grit is formed (5 cm of catalyst 20 minutes resistance time) the macroreticular gel formed is extracted and cut into 4–5 cm pieces.

EXAMPLE No. 2

In the pilot plant of Example No. 1,20 kgs of polystyrene solution is formed in 100 liters of solvent; to this 200 grams of crosslinking agent are added and then sulfuric acid is added as catalyst until a grit is formed (6 ml, 24 minutes). The mixture is transferred to the extruder before the formation of the gel. The extruder being defined by a system of 3 cm diameter, 1 meter long tubes featuring a space for the draining of the mixture. The solution is converted to macroreticular and then compressed in the tube system towards the outlet where a cutting system operates for forming 3–5 cm particles.

The small particles and the solvent are brought to the sulfonation reactor where 65% oleum sulfuric acid is added as a 30% solution in the chlorinated solvent in a sufficient amount so that the concentration of sulfur trioxide is 2.2 Moles/Mole of benzene units. The stirring lasts for 2 hours following the end of sulfonation, and then the product is extracted and brought to a perforated container for straining of the solvent. Then it is passed with the perforated container to be washed with propanol to extract the unreacted chlorosulfonic acid and then is brought to a neutralization tank with 30% potassium hydroxide; then is immersed in 20% sodium chloride for shrinkage, and it is passed with water content of 12% to a container for heating to 160° C. with stirring and under vacuum, following which 80 kgs of product are received in the form of irregular small spheres. In technical terms, it is a light product with a degree of inflation in water in the order of 225 and with a composition of 75% inorganic and 25% organic, with a practical yield of 100%.

EXAMPLE No. 3

A 200 liter 30% polystyrene solution containing 1,2 dichloroethane as the solvent and 12% acetic acid is brought to the sulfonation reactor where chlorosulfonic acid is added in a concentration of 2–2.2 Moles/Mole of benzene units along the polymer with stirring as a 25% solution. The reaction of sulfonation and formation of crosslinks with sulfone radicals advance rapidly and this is measured by the release of hydrogen chloride and the gradual release of the solvent. Finally a gel is formed which is insoluble and after 4 hrs of ripening, the solvent is decanted; then to the gel is added propanol to extract the unreacted chlorosulfonic acid, then it is subjected to partial neutralization with 30% potassium hydroxide. It is taken to the extruder and cut to pieces of 3 to 5 cm, is completely neutralized, and then is subjected to a shrinkage treatment by passing through an electrical field of 20V. Finally, it is deodorized by heating at 160° C. under vacuum with stirring and the product obtained is of brilliant color with a degree of inflation of 258 and with a composition of 23% organic and 77% inorganic.

The hydrogen chloride released is passed through a sulfur trioxide solution in 1,2 dichloroethane where it is absorbed to form chlorosulfonic acid. The exploitation of the hydrogen chloride produced simplifies the transfer of the reactants by passing to a sulfur trioxide solution and formation of chlorosulfonic acid during the reaction with continuous recycling.

EXAMPLE No. 4

20 gr. of the 50–50% styrene-acrylonitrile copolymer are dissolved in the solution reactor in 100 liters of pure 1,2 dichloroethane. 100 grams of the crosslinking agent are added to the solution and then sulfuric acid is also added until a grit is formed. The mixture is brought to an extruder where a gel is formed, and with the exertion of pressure, it is promoted to the tubes so that the material is cut into 4 to 5 centimeter pieces.

The pieces and the solvent are brought to the sulfonation reactor where 65% of oleum sulfuric acid as a 25% solution is added at a quantity of 2 Moles/Mole of benzene rings. The reaction is stirred for 5 hours and the product is removed, strained, neutralized and passed to a 20 V electric field, and finally, with a 5% water content, it is heated at 160° C. with stirring under vacuum and is converted into a high quality product with a degree of inflation in water of 185. This product has two ionic groups, a sulfonic one and a carboxylic one from the hydrolysis of acrylonitrile.

EXAMPLE No. 5

20 gr. of fully hydrogenated SBR (styrene 40%) are brought to a reactor in 100 liters of 1,2 dichloroethane. Following dissolution, 80 gr. of crosslinking agent are added and with the addition of sulfuric acid as a catalyst, the mixture is passed to the extruder where it is transformed to a macroreticular material. The 4 to 5 centimeter pieces produced and the solvent are brought to the sulfonation reactor where 65% oleum sulfuric acid is added as a 25% solution in a quantity of 2 Mole $SO_3$ per Mol of benzene nuclei and stirred for four hours. The product is removed, drained, strained, neutralized and shrunk in a 20V electric field and then heated at 160° C. under stirring and vacuum to give a high quality product with an inflatability ratio of 120.

EXAMPLE No. 6

Inflated polystyrene is brought to 65% oleum sulfuric acid and left to be eroded by the acid. Sulfonated products are formed in the form of sizable spheres in a normal shape and in order. These, following a residence time of 12 hours are collected, and washed with water to form a high value and usable product. They adsorb water up to 40–70 times their weight, depending on the degree of inflation of the polystyrene and are offered as products for agricultural use in the acidic form.

What is claimed is:

1. Method for the preparation of a particulate, stable macroreticular polymer product with MC 30,000 to 50,000, capable of intermolecularly absorbing about 100 to 300 times its weight of water, said method comprising the steps of:
   (i) subjecting a polymer having aromatic groups, in a form of a 10–30% solution in chlorinated solvents(s), to a crosslinking reaction with 2,5-dichloromethyl-1,4-dimethylbenzene, to obtain an insoluble macroreticular gel;
   (ii) extruding and cutting said insoluble macroreticular gel to obtain discrete macroreticular gel particles of a main dimension of 3 to 5 centimeters;
   (iii) reacting said macroreticular gel particles, suspended in chlorinated solvent(s), with sulfonating and, optionally nitrating agents to obtain anionic macroreticular gel particles;
   (iv) subjecting said anionic macroreticular gel particles to a work-up procedure comprising removing solvent(s) from the macroreticular gel particles, washing the macroreticular gel particles to remove/react excess acidic agent, shrinking/dehydrating the macroreticular gel particles in an aqueous salt solution, and deodorizing the macroreticular gel particles.

2. Method according to claim 1, wherein said polymer having aromatic groups is selected from the group comprising polystyrene, hydrogenated styrene butadiene rubber (SBR), styrene-acrylonitrile copolymers and mixtures and/or copolymers thereof.

3. Method according to claim 1, wherein said crosslinking reaction in (i) is carried out in a melt of said polymer.

4. Method according to claim 1, wherein said reaction in (i) is carried out in a temperature ranging from room temperature to about 50° C. and optionally using, as further catalysts, $SbCl_5$ and/or $TiCl_4$, in catalytic amounts.

5. Method according to claim 1, wherein said sulfonating agent(s) being selected from chlorosulfonic acid, sulfur trioxide and oleum sulfuric acid, each in a molar ratio of equivalent sulfur trioxide of 1.5–2 mol per mol of aromatic groups contained in said insoluble macroreticular gel particles and said nitrating agent is a nitration acid.

6. Method according to claim 5, wherein said reaction with sulfonating agent(s) produces further crosslinking of said macroreticular gel particles, through the formation of sulphone bridges, said further crosslinking being controlled with the addition of acetic acid or acetic anhydride as a crosslinking inhibitor in a proportion of 10–20% based on the amount of polymer used.

7. Method according to claims 2 or 5, wherein in the case that said polymer having aromatic groups comprises styrene-acrylonitrile copolymer(s), then carboxylic groups are formed as additional anionic groups, from the hydrolysis of cyano groups in the sulfonation reaction conditions.

8. Method according to claim 1 wherein said extrusion is carried out by pressing said macroreticular gel through an extruder comprising an array of parallel tubes of length of about 1 meter and diameter of about 2 to 4 centimeters and cutting system at one end of the tubes, to form said particles.

9. Method according to claim 8, wherein said insoluble macroreticular gel is formed while the reaction mixture moves through said extruder.

10. Method according to claim 1 wherein said shrinking/dehydration in (iv) is carried out by subjecting said highly anionic macroreticular gel particles to an electric field of 20V.

11. Method according to claim 1, comprising the steps of:
   (i) crosslinking of said polymer having aromatic groups with 2,5-dichloromethyl-1,4-dichlorobenzene and sulfuric acid as the catalyst, under phase dispersion conditions in a two phase system consisting of equal volumes of chlorinated solvent (s) and concentrated sulfuric acid, at a temperature of about 50° C., to obtain small spheres of macroreticular gel;
   (ii) sulfonating said spheres with the addition of:
      sulfuric acid at about 80° C. or
      chlorosulfonic acid at room temperature in a molar excess of about 1.5–2.0 of the mols of aromatic rings present in said polymer having aromatic groups,
      in the presence of acetic acid as a crosslinking inhibitor, to obtain sulfonated macroreticular gel spheres; and (iii) removing said sulfonated macroreticular gel spheres by filtration, and shrinking/dehydrating and deodorizing same;

wherein the solvent system is recovered after the reaction, purified through distillation and recycled in the process.

12. Method according to claim 1 comprising the steps of:
(i) sulfonating a 10–30% solution of said polymer having aromatic groups in chlorinated solvent(s) with a sulfonating agent comprising chlorosulfonic acid, whereby the formation of sulfone crosslinks is also promoted and regulated through the presence of about 10–20% of the polymer used of acetic acid as a crosslinking inhibitor, to obtain insoluble sulfonated/crosslinked macroreticular gel;
(ii) distilling off the solvent by vacuum distillation with the acetic acid in it for recycling;
(iii) washing said insoluble sulfonated/crosslinked macroreticular gel with methanol or ethanol to react and remove the unreacted chlorosulfonic acid and subsequently partly neutralizing the same in concentrated sodium or potassium hydroxide, to obtain the pure product;
(iv) shaping the product obtained of the neutralized sulfonated macroreticular structure in an extruder to obtain particles of the product of main dimension of about 3–5 centimeters;
(v) subjecting said particles of the product to full neutralization as in (ii) above, shrinking/dehydration of the product if needed and deodorization by heating under vacuum in a temperature up to about 160° C. to essentially remove all remaining water and traces of solvent(s).

13. Method according to claim 11 or 12, wherein said polymer having aromatic groups is selected from the group comprising polystyrene, hydrogenated styrene butadiene rubber (SBR), styrene-acrylonitrile copolymers and mixtures and/or copolymers thereof.

14. Method according to claim 11 or 12, wherein in the case that said polymer having aromatic groups comprises styrene-acrylonitrile copolymer(s), then carboxylic groups are formed as additional anionic groups, from the hydrolysis of cyano groups in the reaction conditions.

15. Method according to claim 12 wherein said extrusion is carried out by pressing said macroreticular polymer product through an extruder comprising an array of parallel tubes of length of about 1 meter and diameter of about 3 to 4 centimeters and a cutting system at one end of the tubes, to form said particles of product.

16. Method according to claim 11 or 12 wherein said shrinking/dehydration is carried out by subjecting said particles to an electric field of 20V.

17. A stable product obtained according to claim 1, 11 or 12, which is mixed with a soil to act constantly as humidity regulator and fertility promoter thereof.

18. The method according to claim 1, wherein the removal of solvent is by vacuum distillation, the washing is performed with methanol or ethanol, the neutralizing is performed with sodium or potassium hydroxide solution at a concentration of about 30 wt %, the shrinking/dehydrating of the macroreticular gel particles is performed with an aqueous salt solution comprising 15–25% sodium chloride to a water content of about 10%, and the deodorizing step is performed at a temperature of about 160° C. under vacuum to essentially remove all remaining alcohol and alcohol products and traces of solvent(s).

\* \* \* \* \*